US011487398B1

(12) United States Patent
Wei et al.

(10) Patent No.: US 11,487,398 B1
(45) Date of Patent: Nov. 1, 2022

(54) COMPUTING DEVICE WITH WINDOW DOCKING AND RELATED SYSTEMS AND METHODS

(71) Applicant: CITRIX SYSTEMS, INC., Fort Lauderdale, FL (US)

(72) Inventors: Daowen Wei, Jiangsu (CN); Jian Ding, Jiangsu (CN); Hengbo Wang, Jiangsu (CN); Yanjun Su, Jiangsu (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 17/454,102

(22) Filed: Nov. 9, 2021

Related U.S. Application Data

(63) Continuation of application No. PCT/CN2021/123388, filed on Oct. 13, 2021.

(51) Int. Cl.
*G06F 3/0481* (2022.01)

(52) U.S. Cl.
CPC .. *G06F 3/0481* (2013.01); *G06F 2203/04803* (2013.01)

(58) Field of Classification Search
CPC ............. G06F 3/0481; G06F 2203/04803
See application file for complete search history.

(56) References Cited

U.S. PATENT DOCUMENTS

| 5,819,055 | A | * | 10/1998 | MacLean | G06F 3/0481 715/798 |
| 5,977,973 | A | * | 11/1999 | Sobeski | G09G 5/14 715/804 |
| 2007/0008338 | A1 | * | 1/2007 | Kim | G09G 5/006 345/629 |
| 2009/0064035 | A1 | * | 3/2009 | Shibata | G06F 3/0481 715/803 |
| 2012/0084717 | A1 | * | 4/2012 | Yao | G06F 3/0481 715/792 |
| 2014/0229891 | A1 | * | 8/2014 | O'Byrne | G06F 9/451 715/790 |
| 2015/0378518 | A1 | * | 12/2015 | Heydlauf | G06F 3/0481 715/804 |
| 2016/0349974 | A1 | * | 12/2016 | Louch | G06F 3/0486 |

* cited by examiner

*Primary Examiner* — Mong-Shune Chung
(74) *Attorney, Agent, or Firm* — Allen, Dyer, Doppelt + Gilchrist, PA

(57) ABSTRACT

A computing device may include a display, and a processor coupled to the display and configured to generate a GUI current screen on the display. The GUI current screen may include a first window and a second window docked to the first window, the second window overlapping the first window. The processor may be configured to determine an interaction region in the first window based upon user input in the first window, determine a ratio of overlap between the first window and the second window, and resize the second window based upon the ratio of overlap and so that the second window does not overlap the interaction region.

25 Claims, 14 Drawing Sheets

COMPUTING DEVICE WITH WINDOW DOCKING AND RELATED SYSTEMS AND METHODS

RELATED APPLICATIONS

This application is a continuation of U.S. application serial no. PCT/CN2021/123388 filed Oct. 13, 2021, which is hereby incorporated herein in its entirety by reference.

TECHNICAL FIELD

The present disclosure relates to computing systems, and more particularly, to window management in a graphical user interface for computing systems.

BACKGROUND

A multi-monitor environment is the use of multiple physical display devices, such as monitors, in order to increase the area available for programs and applications running on a single computer system. As an alternative to multiple physical display devices, a single large monitor may be used where the monitor is split into multiple virtual monitors. Regardless of method, the typical screen real estate for a computer is growing.

With large screens, it may be problematic to utilize the entire screen real estate efficiently. This problem is made all the more present with the wide adoption of 4k and 8k monitors. The core of the issue is that most applications are simply not designed to render well on such high resolution displays. Moreover, most operation systems window management tools may not address this issue well enough. This results in users manually positioning windows to maximize functionality.

SUMMARY

Generally, a computing device may include a display, and a processor coupled to the display and configured to generate a graphical user interface (GUI) current screen on the display. The GUI current screen may include a first window and a second window docked to the first window. The second window overlaps the first window. The processor may be configured to determine an interaction region in the first window based upon user input in the first window, determine a ratio of overlap between the first window and the second window, and resize the second window based upon the ratio of overlap and so that the second window does not overlap the interaction region.

Also, the processor may be configured to when the ratio of overlap is less than a first threshold, retain an original size for the second window, and otherwise when the ratio of overlap is less than a second threshold greater than the first threshold, resize the second window until the ratio of overlap is less than the first threshold. The processor may be configured to, when the ratio of overlap is greater than the second threshold, divide the GUI current screen into a plurality of different content regions. Each different content region may have a region size value, and a region position value. The processor may also be configured to classify each of the plurality of different content regions as a content type from among a plurality of different content types, and generate a new window position value for the second window based upon the respective region size values, the respective region position values, and the respective content types of the plurality of different content regions. The processor may be configured to merge adjacent different content regions with a same content type.

Additionally, the processor may be configured to classify the second window as a content type from among the plurality of different content types, and resize the second window based upon a threshold size for the second window. The threshold size for the second window may be based upon a content type of the second window. The processor may be configured to, when the second window is at the threshold size for a time period greater than a set time period, determine a distance between the interaction region and the second window, and when the distance between the interaction region and the second window is greater than a threshold distance, resize the second window to an original size for the second window.

In some embodiments, the plurality of different content types may include a transient content type, a static content type, and a blank content type. The classifying may comprise masking the GUI current screen with a background image, and classifying matching content regions as the blank content type. The processor may be configured to generate a heat map of historical user input in the first window, and when the heat map is greater in size than the interaction region, scale up the interaction region to encompass the heat map. The processor may be configured to determine the interaction region based upon a cursor position.

Another aspect is directed to a computing system comprising at least one server configured to provide a virtual computing session comprising a GUI, and a client computing device in communication with the at least one server. The client computing device may be configured to access the virtual computing session via a communications network, and display a GUI current screen comprising a first window and a second window docked to the first window. The second window may overlap the first window. The at least one server may be configured to determine an interaction region in the first window based upon user input in the first window, determine a ratio of overlap between the first window and the second window, and resize the second window based upon the ratio of overlap and so that the second window does not overlap the interaction region.

Yet another aspect is directed to a method of operating a GUI on a display, the GUI comprising a GUI current screen comprising a first window and a second window docked to the first window. The second window may overlap the first window. The method may include determining an interaction region in the first window based upon user input in the first window, determining a ratio of overlap between the first window and the second window, and resizing the second window based upon the ratio of overlap and so that the second window does not overlap the interaction region.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
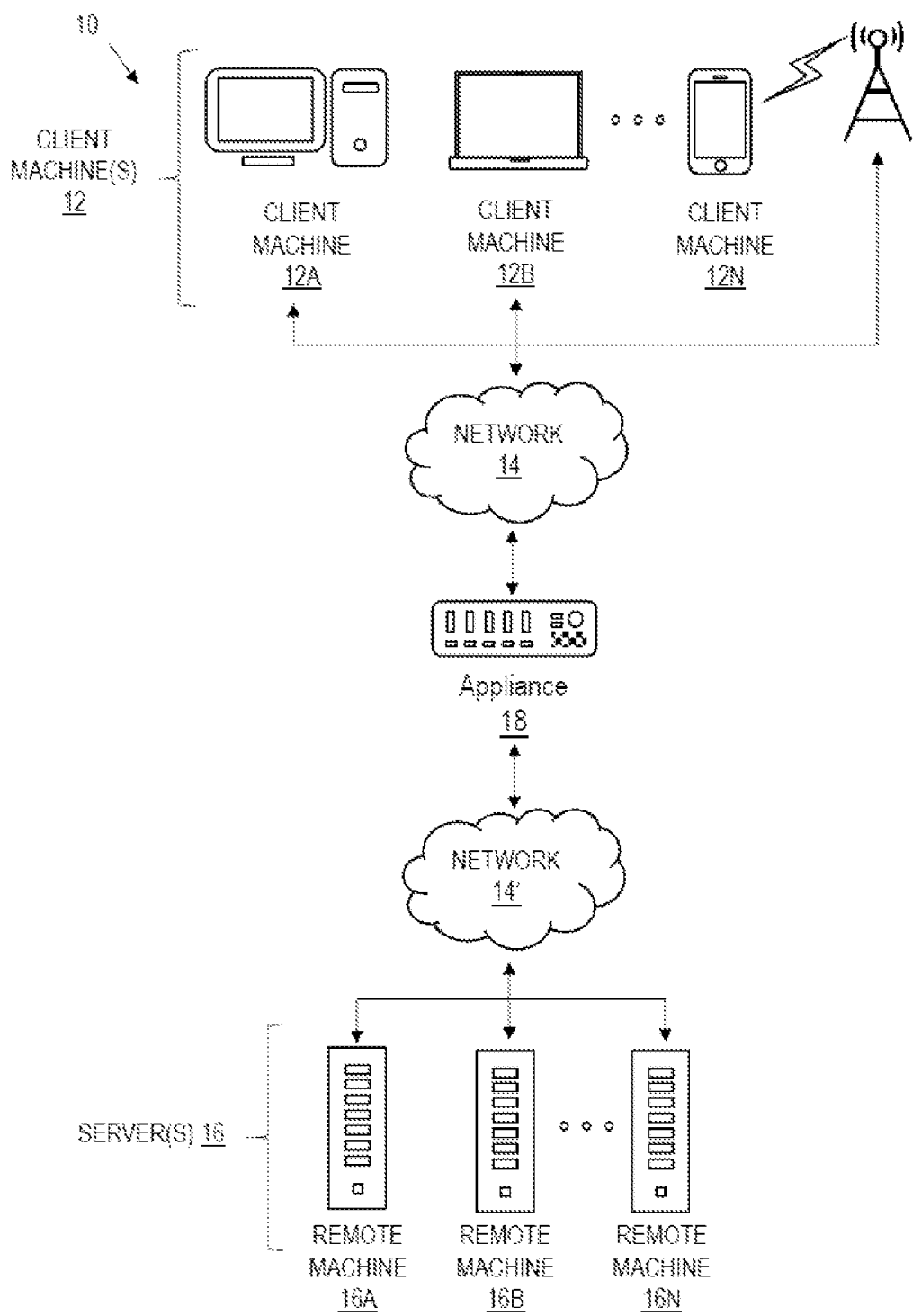
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
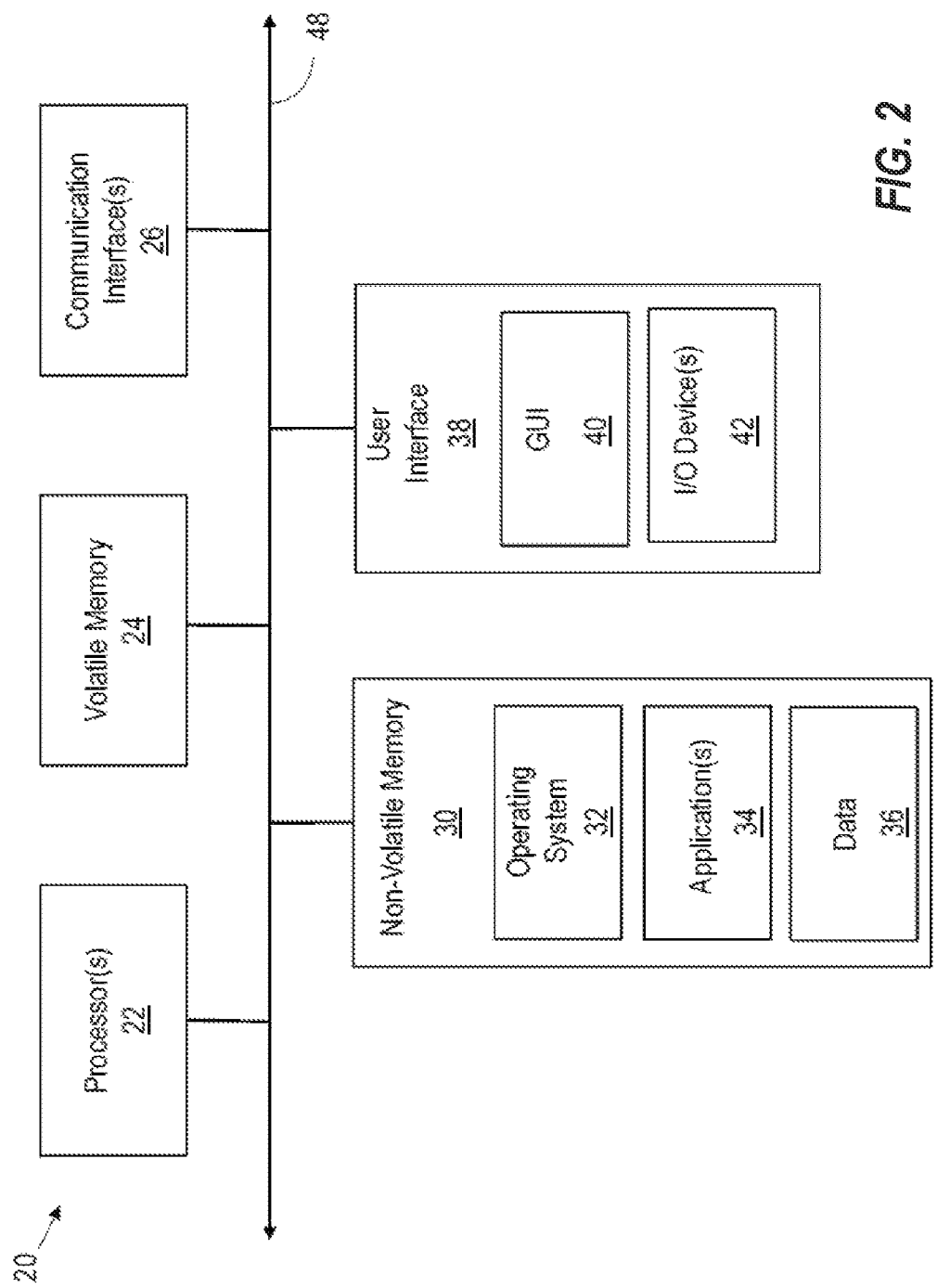
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a GUI 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
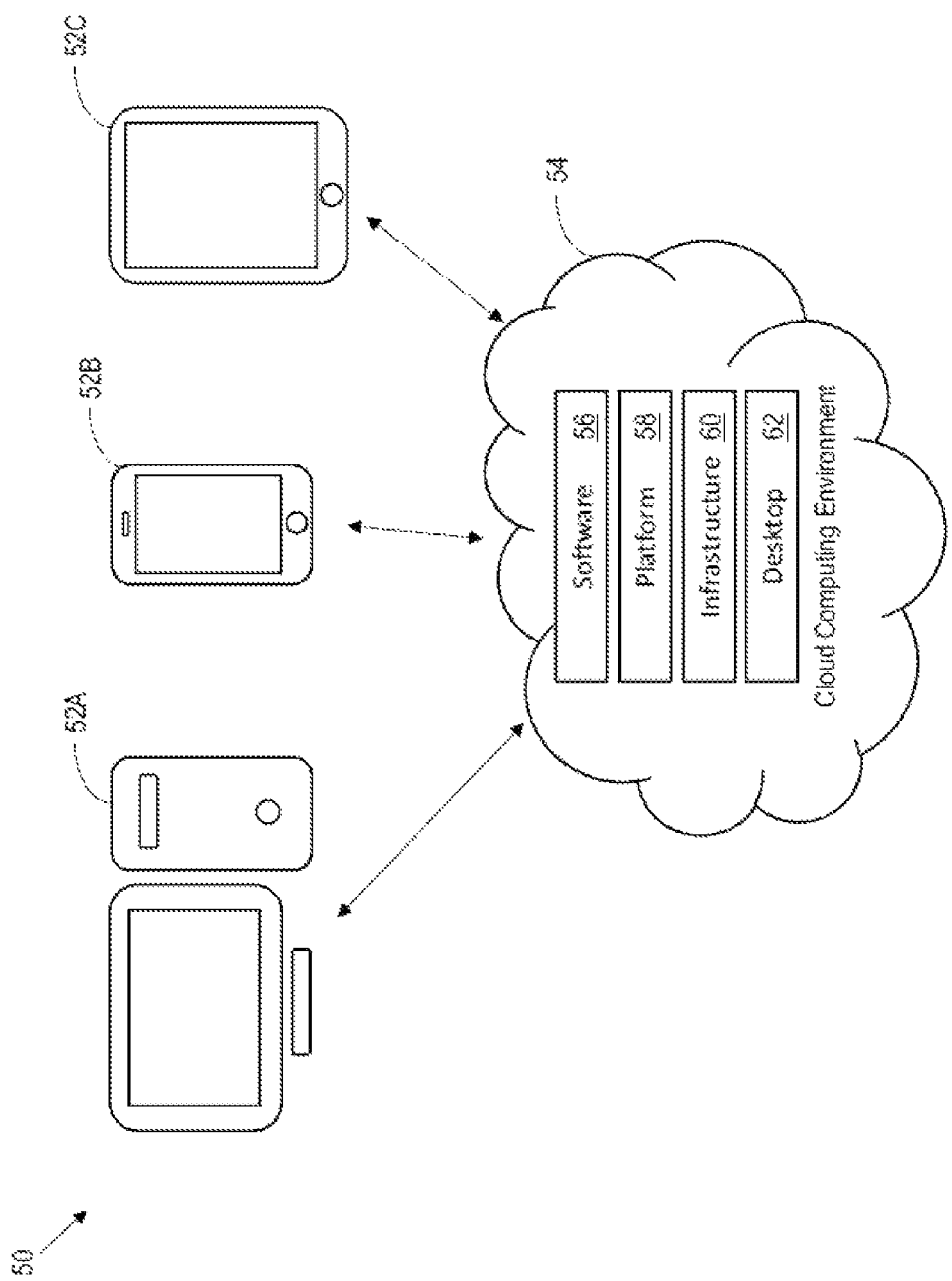
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft ONEDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
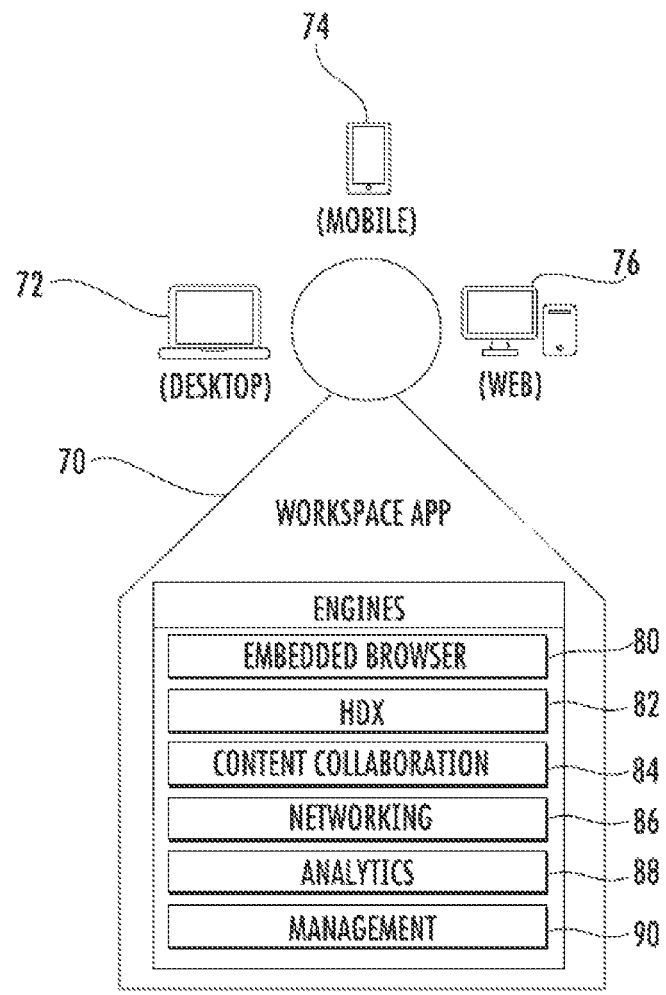
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
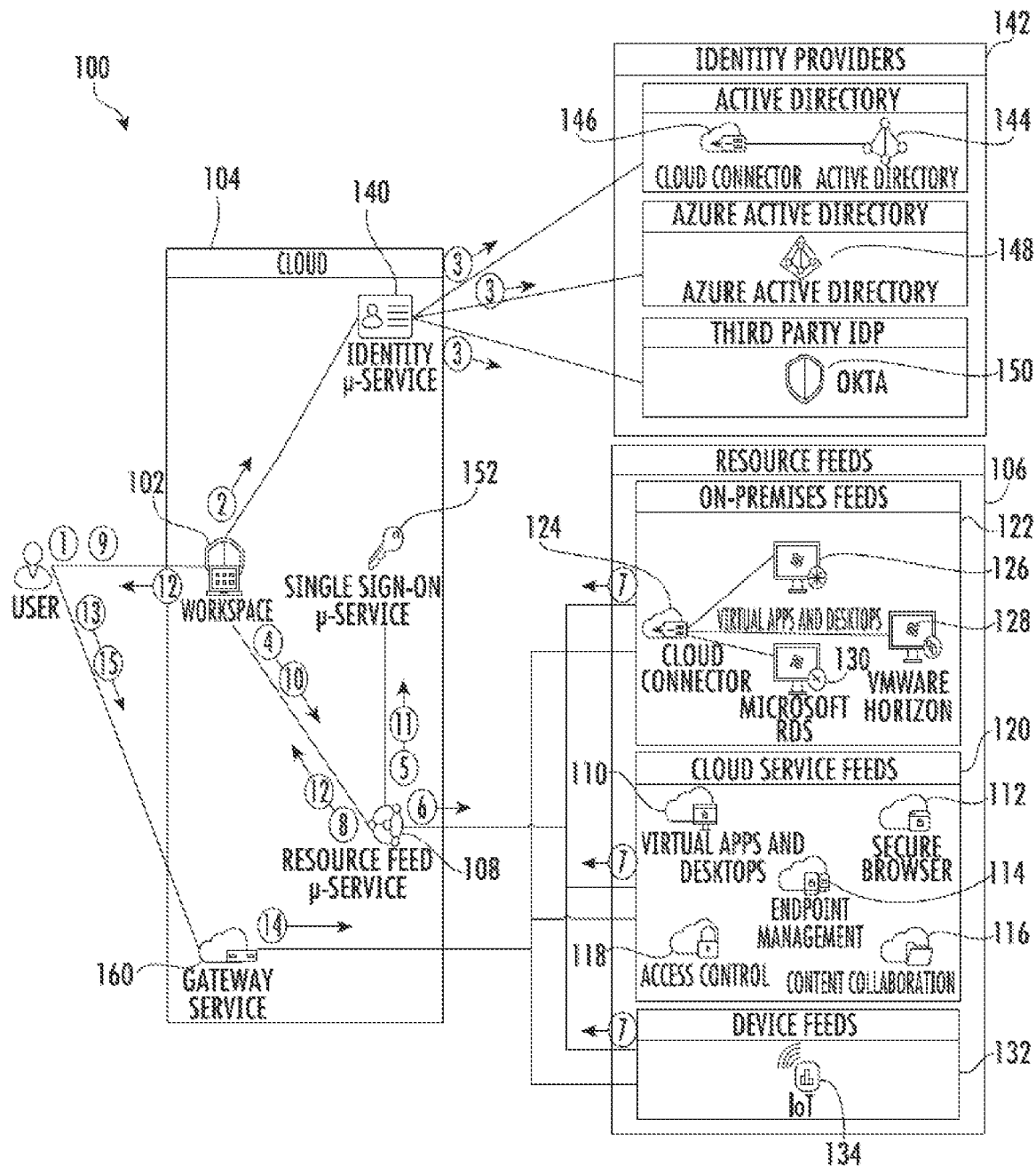
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

The Microsoft Windows operating system has some approaches for automatically arranging windows, in particular, placing them side-by-side or tiling them on the screen. The cascade windows option will arrange all open windows in a cascade, allowing the user to see all their title bars at once. It could be helpful to navigate windows by title and open a target window quickly, especially when windows are switched back and forth frequently. However, this option isn't the most practical. The show windows stacked option allows you to arrange all open windows stacked vertically on top of each other. It may be problematic for a typical wide-screen display. The show windows side-by-side option allows for automatically arranging all open windows side-by-side with each other. This is similar to the Aero Snap feature, but it allows you to have three or more windows automatically positioned so they are arranged side-by-side.

In short, the stacked option may be helpful on a display in the vertical mode, while side-by-side option is more helpful in a wide-screen display. With either the stacked option or the side-by-side option, all open windows are automatically arranged in similar size. When there are multiple open windows, each window is arranged in a small window size, and its content in the window may be hard to read. Thereby, it may be problematic to execute multitask collaboration across windows. Indeed, the user often works on one active window at a time, but sometimes collaborates on two or more windows using one of the following options.

The first option is to switch back and forth across multi-task windows using the cascade window option, or combination key, such as the alt+tab key combination, or a manual click. This approach may be time consuming to switch to a target window, especially when there are many irrelevant windows. The second option comprises automatically tiling all open windows in small size on desktop by either stacked option or side-by-side option. The target multitask window would be arranged in a smaller size when more irrelevant windows are open. This may be less desirable because content may be hard to read. The user seldom uses this option for multitask collaboration across windows due these issues. The third option is to manually arrange collaborative windows in user desired size and to avoid overlap. It could push user to realign their window position and readjust their window size. This option is popular to arrange collaborative windows, especially for an environment with multiple displays or a 4K bigger screen. However, frequent realignment and readjustment may provide a less desirable user experience.

In a collaborative mode, the windows can be labeled as either the master window or the slave window based on user interactive activities. The master window means a window where user interaction happens frequently, such as mouse, keyboard and gesture activities. The slave window means a window where the user either maintains low interest or occasionally interacts therewith.

In some collaboration applications, there are a master window and a slave window. Both windows are docked in stacked vertical mode, or side-by-side with each other, or a floating window at topmost. Either zero overlap or partial overlap is manually arranged between them. The relative window position or window size depends on user requirements, content in windows, and the interaction region.

For example, a content auditor records something in the master window, while images or videos to be edited are shown in the slave window. A conference call participant is doing something in the master window in parallel, while occasionally checking a shared screen on conference call in case of something user is interested in, or a picture-in-picture online videos for entertainment.

From the monitor frequency point of view, the slave window content is closely monitored by user, while some like non-critical online conference call are occasionally checked. From the logic relationship point of view, the slave window collaborates with master window closely to achieve a common goal. In some applications, the slave window has a loose relationship with its master window. In the loose relationship, even the slave window has no logical relationship with master, just for parallel handling. From the content type point of view, the slave window displays text, images, videos or mixture. From the docked position point of view, the slave window can be docked in zero overlap or in partial overlap by stacked option, side-by-side option, and topmost floating window.

Typically, the frequent realigning of the window's position and readjusting the window's size to guarantee no overlap between the interactive rectangle in the master window and the focus rectangle on the slave window. Thereby, it requires the user to frequently move the slave window to somewhere or change its window size to avoid overlap.

The present disclosure provides a solution to these issues of typical approaches. In particular, a method to detect an interactive region in the master window, and then automatically reshape the slave window to avoid overlaps. The method provides for auto adjustment, which could reduce frequent manual movement or resizing and improve user experience for multitask collaboration.

Figure 6:
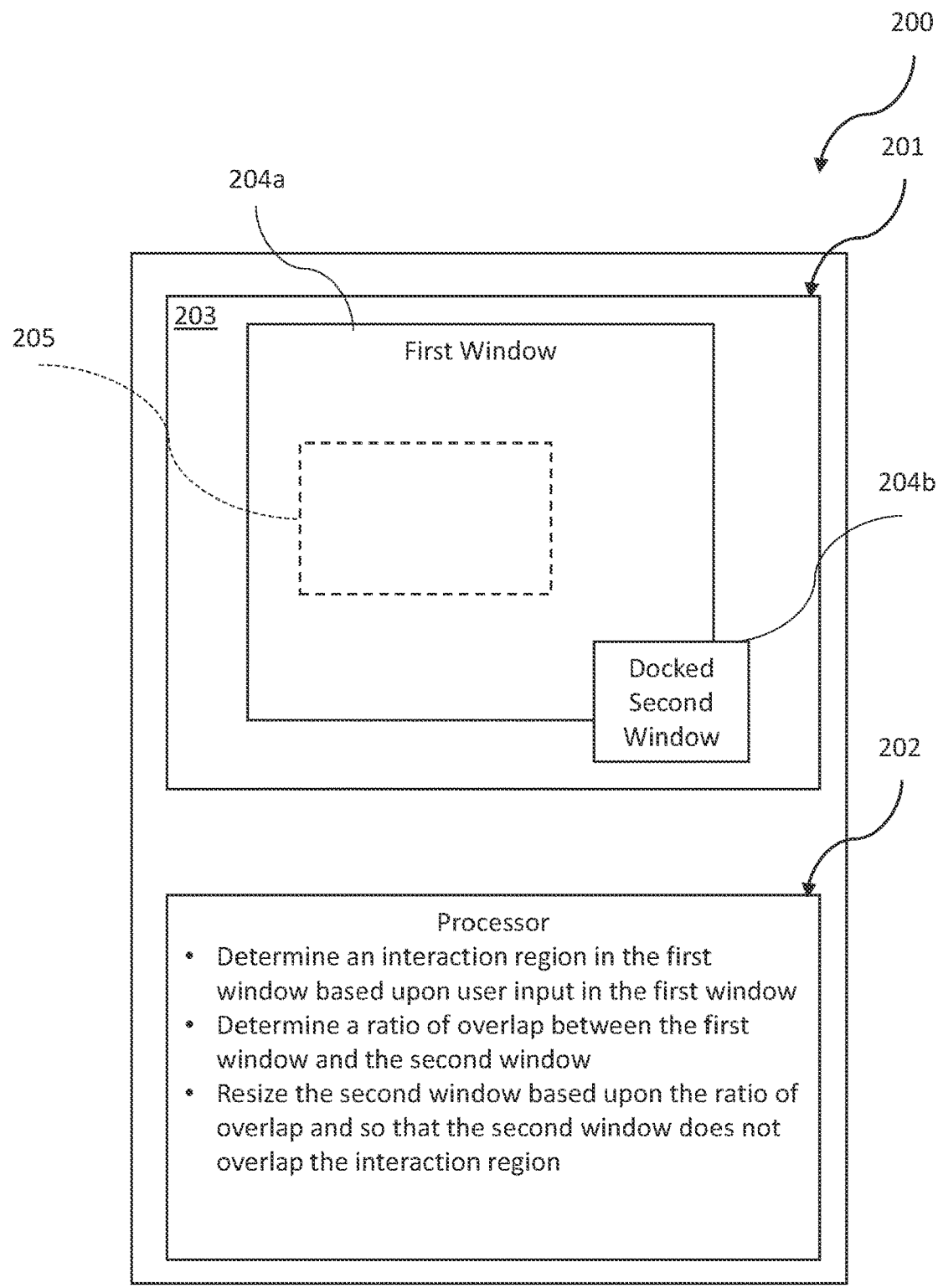
FIG. 6 is a schematic block diagram of a computing device in which various aspects of the disclosure may be implemented.
Figure 7:
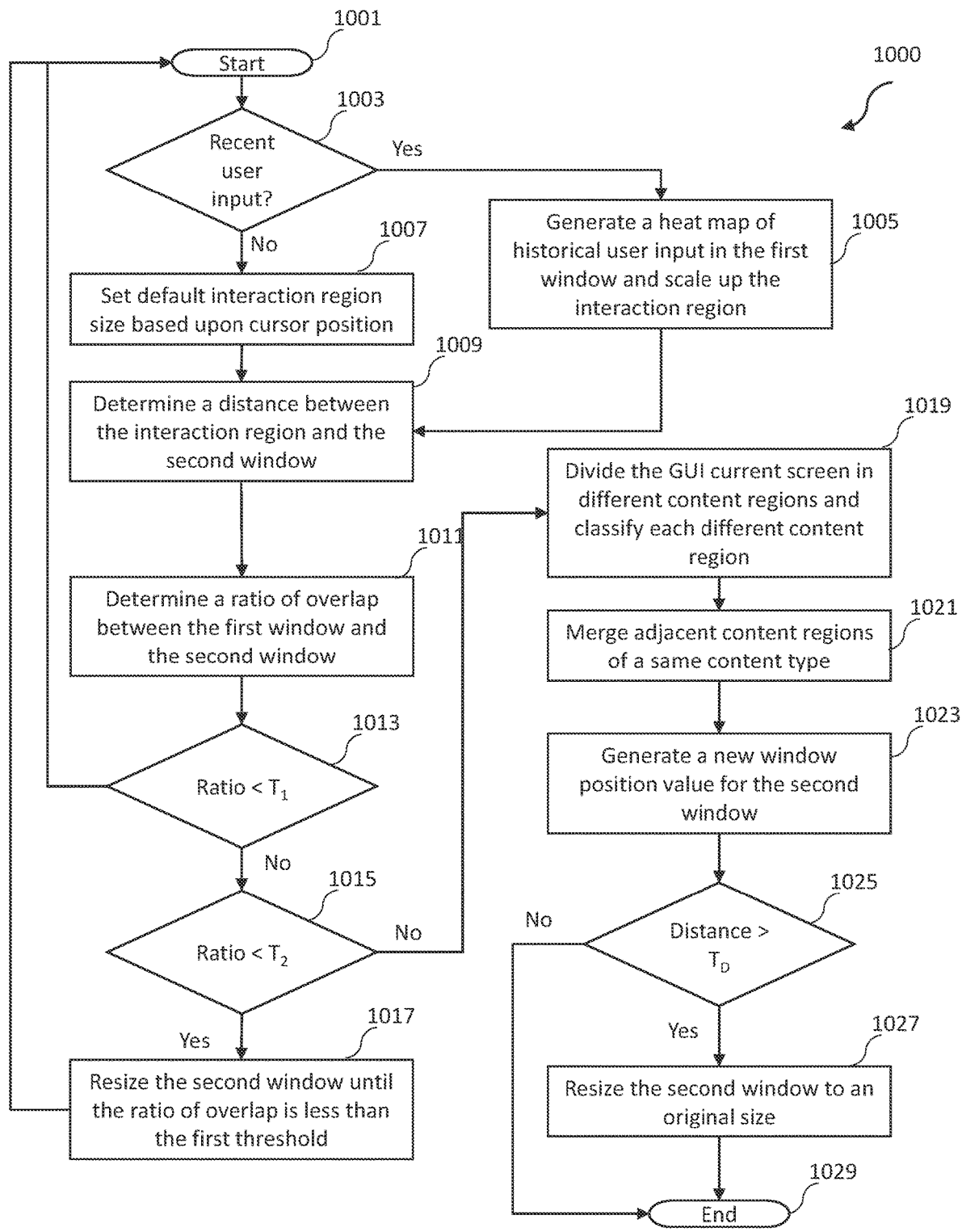
FIG. 7 is a flowchart of a method of operating the computing device of FIG. 6.
Figure 10:
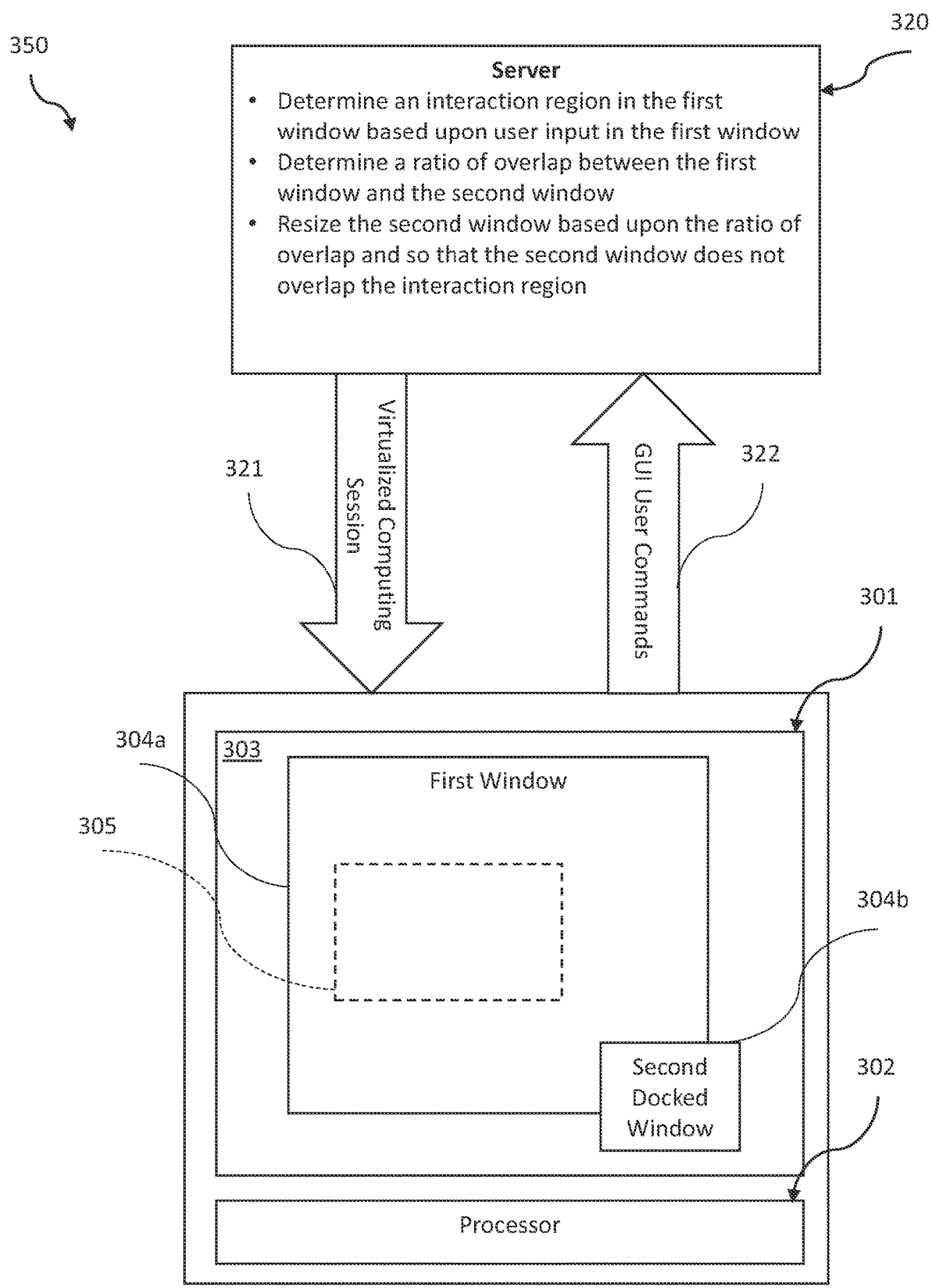
FIG. 10 is a schematic block diagram of a computing system in which various aspects of the disclosure may be implemented.
Figure 11:
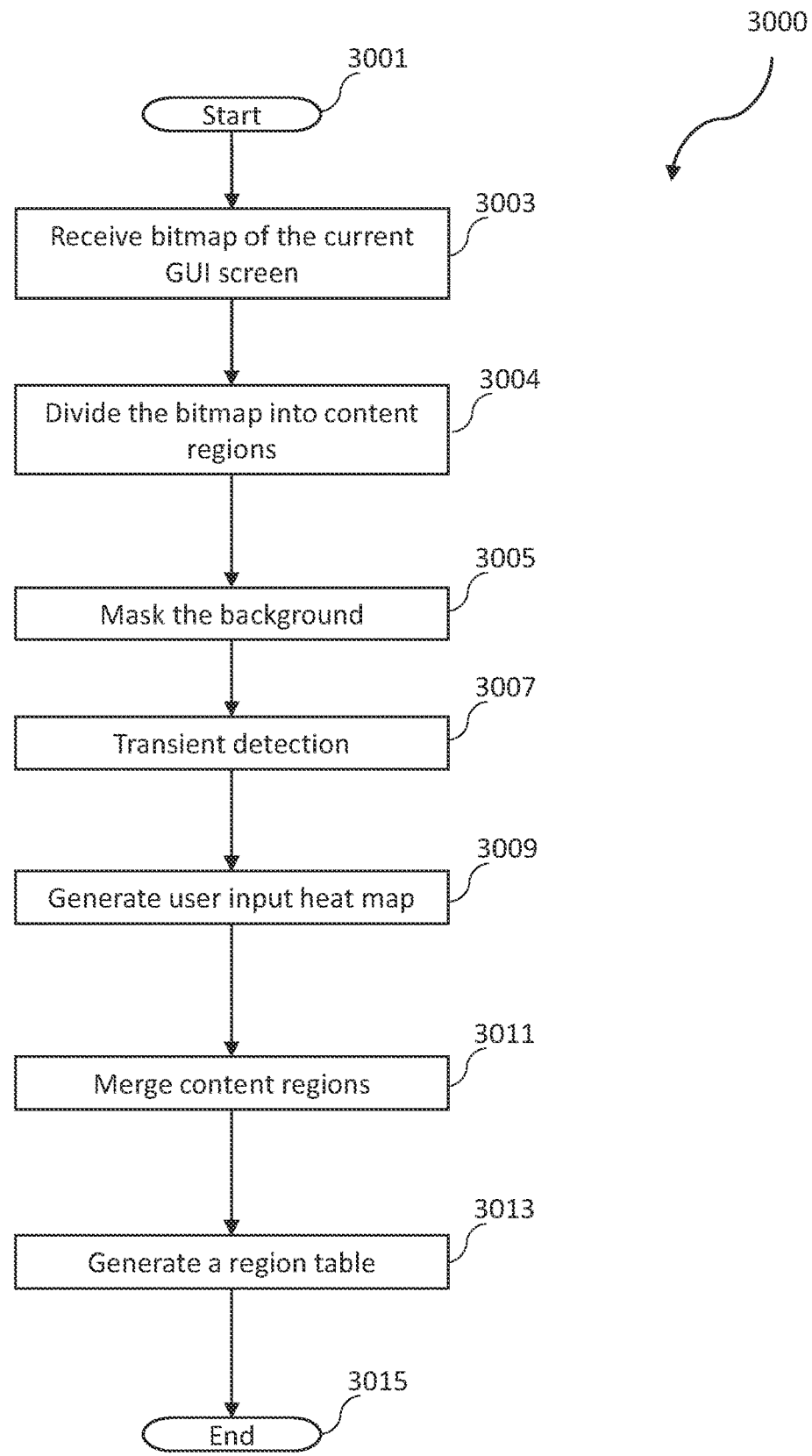
FIG. 11 is a flowchart of dividing and classifying the GUI current screen of the computing device of FIG. 6.
Figure 12:
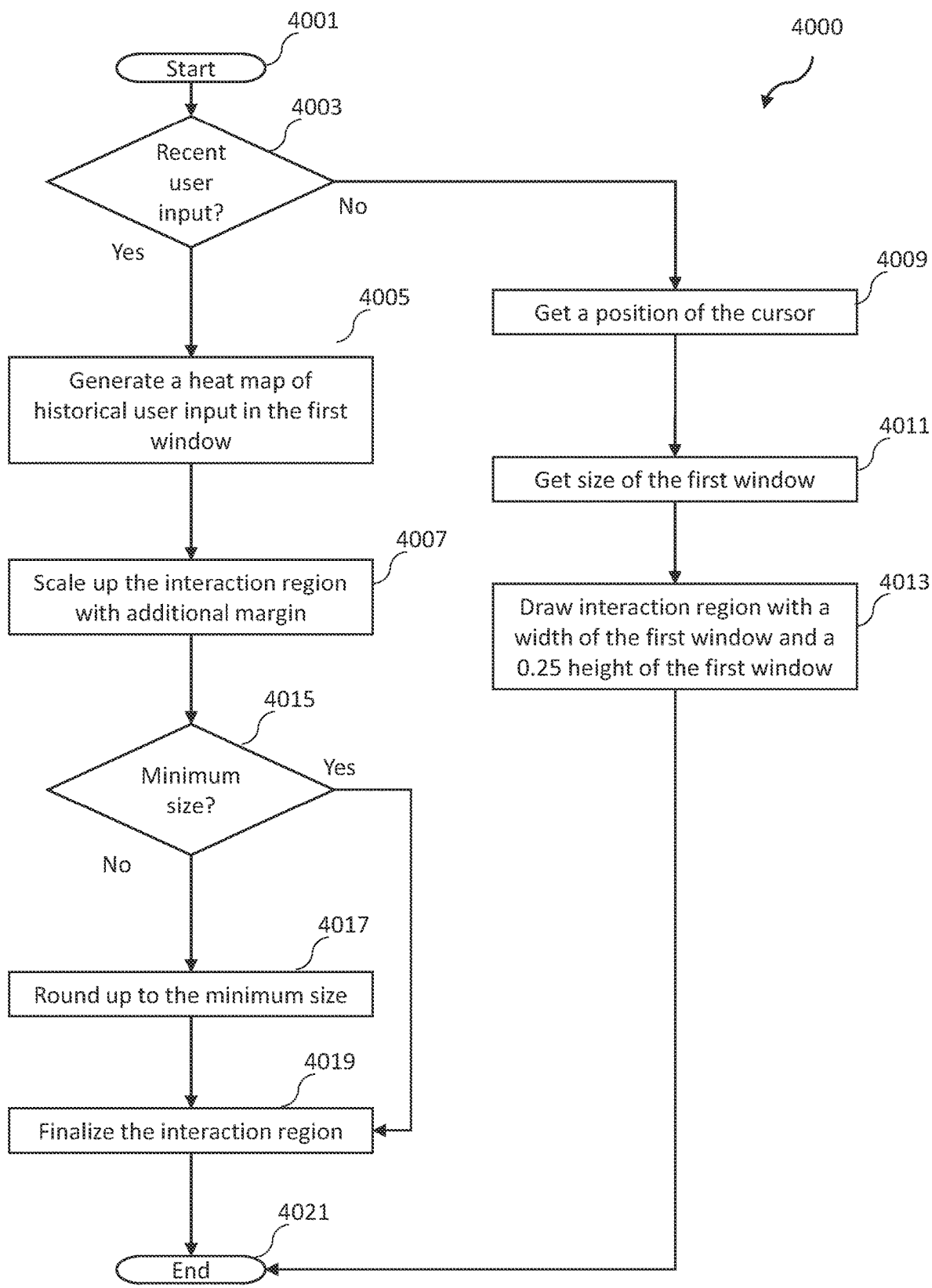
FIG. 12 is a flowchart of generating the interaction region in the GUI current screen of the computing device of FIG.

Referring now to FIGS. 6-7, a computing device 200 according to the present disclosure is now described. The computing device 200 may provide an approach to the above described issues with existing approaches. Also, a method of operating the computing device 200 is also described with reference to a flowchart 1000, which begins at Block 1001. Although this embodiment is illustratively shown as a standalone computing device, it should be appreciated that the teachings herein can be applied to virtualized operating systems, such as shown in the embodiment of FIG. 10.

The computing device 200 illustratively includes a display 201 (e.g. multi-monitor display or single monitor display), and a processor 202 coupled to the display. The processor 202 is configured to generate a GUI current screen 203 on the display 201. The GUI current screen 203 illustratively includes a first window 204a and a second window 204b docked to the first window. In other words, the first window 204a comprises a main/primary window, or a master window, and the second window 204b comprises a docked window, subordinate window, or slave window. As shown, the second window 204b partially overlaps the first window 204a.

The processor 202 is configured to determine an interaction region 205 in the first window 204a based upon user input in the first window. In the illustrated embodiment, the interaction region 205 is a rectangle in shape, but other shapes are also possible in other embodiments (e.g. round shapes, trapezoid). At Blocks 1003, 1005, the processor 202 is configured to, when there has been recent user input in the first window 204a, generate a heat map of historical user input in the first window. For example, the definition of recent input may comprise user input in the last 5 minutes. If there has been no recent user input, the processor 202 is configured to generate the interaction region with a default size and place it based upon a cursor position within the GUI current screen 203, i.e. centered on the cursor position. (Block 1007). For example, the default size of the interaction region 205 may comprise the width of the first window 204a, and quarter of the height of the first window.

The processor 202 is also configured to generate the interaction region 205 based upon the heat map of historical user input in the first window 204a. In particular, the processor 202 is configured to when the heat map is greater in size than the interaction region 205, scale up the interaction region to encompass the heat map. In some embodiments, the processor 202 is configured to further scale up the interaction region 205 to encompass the heat map with additional margin, for example, 10% bigger than the heat map.

The processor is configured to determine a distance between the interaction region 205 and the second window 204b. (Block 1009). The processor 202 is configured to determine a ratio of overlap between the first window 204a and the second window 204b. (Block 1011). As will be appreciated, the ratio of overlap between the first window 204a represents how much of the first window 204a is obfuscated by the second window 204b docked thereto.

The processor 202 is configured to determine resize the second window 204b based upon the ratio of overlap and so that the second window does not overlap the interaction region 205. In particular, the processor 202 is configured to when the ratio of overlap is less than a first threshold ($T_1$) (Block 1013), retain an original size for the second window 204b, and otherwise when the ratio of overlap is less than a second threshold ($T_2$) and greater than the first threshold (Block 1015), resize the second window until the ratio of overlap is less than the first threshold (Block 1017).

Figure 8A:
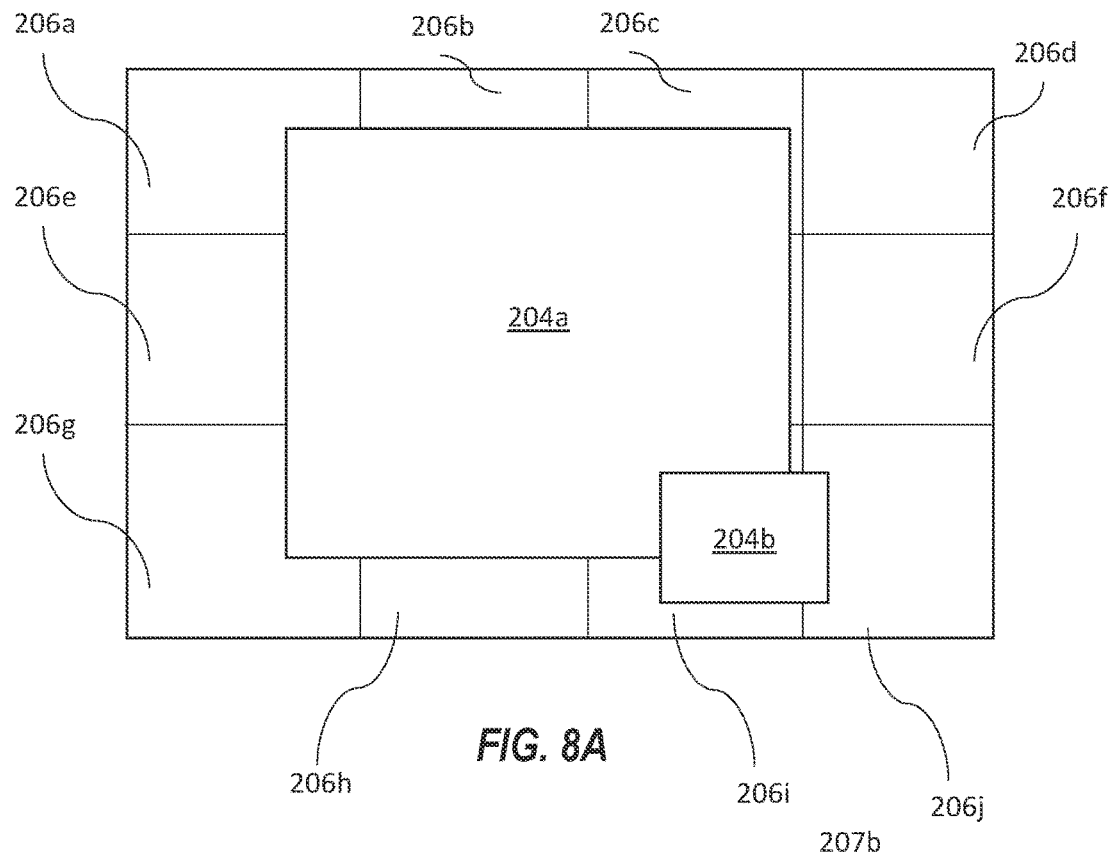
FIGS. 8A-8B are schematic diagrams of classification of different content regions in the computing device of FIG. 6.
Figure 8B:
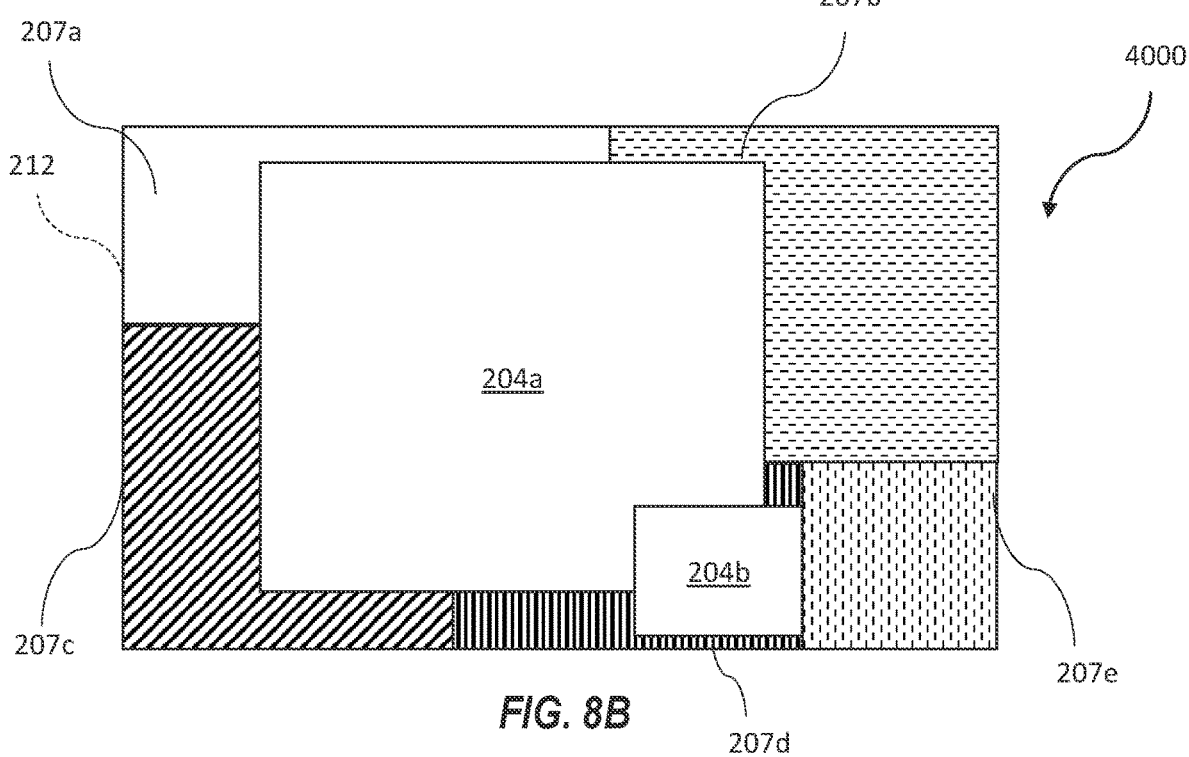

Referring now additionally to FIGS. 8A-8B, the processor 202 is configured to, when the ratio of overlap is greater than the second threshold, divide the GUI current screen 203 into a plurality of different content regions 206a-206j. (Block 1019). Each different content region 206a-206j may have a region size value, and a region position value. The processor 202 is configured to classify each of the plurality of different content regions 206a-206j as a content type from among a plurality of different content types.

In some embodiments, the plurality of different content types may include a transient content type, a static content type, and a blank content type. The classifying may comprise masking the GUI current screen 203 with a background image, and classifying matching content regions as the blank content type. As perhaps best seen in FIG. 8B, the processor 202 is configured to merge adjacent different content regions 206a-206j with a same content type into merged content regions 207a-207e. (Block 1021).

Additionally, the processor 202 is configured to classify the second window 204b as a content type from among the plurality of different content types, and resize the second window based upon a threshold size for the second window. The threshold size for the second window 204b is based upon a content type of the second window. In particular, the second window 204b with text content may have a greater threshold size as compared to image content.

In some embodiments, the processor 202 is configured to, when the second window 204b is at the threshold size for a time period greater than a set time period, determine a distance between the interaction region and the second window, and when the distance between the interaction region and the second window is greater than a threshold distance, resize the second window to an original size for the second window. (Blocks 1023, 1025, 1027, 1029).

Figure 9:
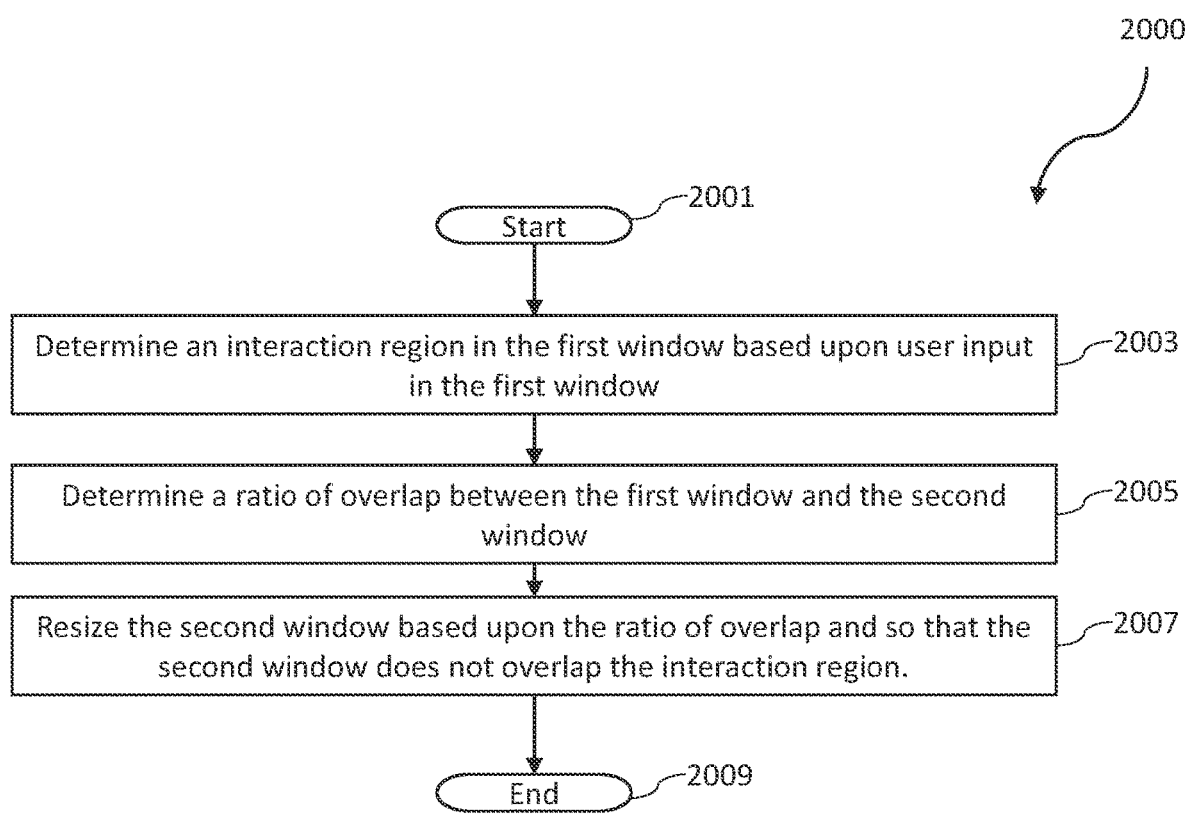
FIG. 9 is a flowchart of a method of operating the computing device of FIG. 6.

Referring now to FIG. 9, a method of operating a GUI on a display 201 is now described with a flowchart 2000, which begins at Block 2001. The GUI comprises a GUI current screen 203 comprising a first window 204a and a second window 204b docked to the first window. The second window 204b overlaps the first window 204a. The method includes determining an interaction region 205 in the first window 204a based upon user input in the first window (Block 2003), determining a ratio of overlap between the first window and the second window 204b (Block 2005), and resizing the second window based upon the ratio of overlap and so that the second window does not overlap the interaction region. (Block 2007). The method ends at Block 2009.

Referring now additionally to FIG. 10, a computing system 350 is now described. In this embodiment of the computing system 350, those elements already discussed above with respect to FIGS. 6-8 are incremented by 100 and most require no further discussion herein. This embodiment differs from the previous embodiment in that this computing system 350 illustratively includes a server 320 configured to provide a virtual computing session 321 comprising a GUI, and a client computing device 300 in communication with the server and configured to access the virtual computing session via a communications network and provide GUI user commands 322 to the server.

The client computing device 300 is configured to access the virtual computing session 321 via a communications network, and display a GUI current screen 303 comprising a first window 304a and a second window 304b docked to the first window. The second window 304b overlaps the first window 304a. The server 320 is configured to determine an interaction region 305 in the first window 304a based upon user input in the first window, determine a ratio of overlap between the first window and the second window 304b, and resize the second window based upon the ratio of overlap and so that the second window does not overlap the interaction region.

Referring now to FIGS. 6, 7A-7B & 11, a more detailed description of the steps for dividing and classifying the GUI current screen 203 is provided using a flowchart 3000, which begins at Block 3001. The processor 202 is configured to ingest a bitmap of the GUI current screen 203, and divide the GUI current screen into a plurality of different content regions 206a-206j. (Blocks 3003, 3004). Each different content region 206a-206j has a region size value, and a region position value. In some embodiments, the processor 202 is configured to divide the GUI current screen 203 into equal sized content regions 206a-206j (e.g. 16 pixel*16 pixel blocks). As will be appreciated, a smaller content region block size provides for greater precision, but does come at the cost of computational resources. Moreover, although each different content region 206a-206j is illustratively rectangle-shaped, other shapes may be used in other embodiments.

The processor 202 is configured to classify, for example, in sequential fashion, each of the plurality of different content regions 206a-206j as a content type from a plurality of different content types. (See Table 1). More specifically, the plurality of different content types may comprise a transient content type (e.g. video), an active static content type (e.g. currently edited document), an inactive static content type (e.g. dormant document), and a blank content type (i.e. blank space in the GUI current screen 203). Each different content type has a respective tolerance to being obfuscated by the second window 204b. Starting with the most tolerant blank content type, the inactive static content type is next, and the active static content type follows the inactive static content type. The transient content type is the least tolerant to obfuscation by the second window 204b.

In the illustrated embodiment, the classifying method proceeds via process by elimination. Firstly, the classifying includes masking the GUI current screen 203 with a background image (i.e. the background image of the desktop of the GUI) (Block 3005), and classifying matching content regions 206a-206j as the blank content type. Once the blank content type regions have been filtered out, the classifying comprises performing a transient content detection algorithm to classify remaining non-matching content regions 206a-206j as the transient content type. (Blocks 3007). As will be appreciated, any suitable algorithm for detecting transient properties in image data can be used.

Once the transient content type regions have been filtered out, the classifying comprises processing historical GUI interaction to classify remaining non-matching content regions 206a-206j as one of the active static content type and the inactive static content type. In particular, the processor 202 is configured to determine whether a remaining content regions 206a-206j has had any user input within a set time period (e.g. 1 minute, 15 seconds). When there has been user input within the set time period, the processor 202 is configured to classify the content region 206a-206j as the active static content type, otherwise the processor is configured to classify the content region as the inactive static content type. The processor 202 is configured to generate the user input heat map. (Block 3009).

Once all the different content regions have been classified, the processor 202 is configured to merge adjacent different content regions 206a-206j with a same content type, simplifying the overall mapping. (Block 3011). Also, the processor 202 is configured to generate a content region table, providing a convenient data structure for storing the content region 206a-206j mapping. (Block 3013). For example, the content region table may comprise an entry format of: region number; vertex coordinate; region size (Width*Height); and content tag (i.e. content region type). The method ends at Block 3015.

TABLE 1

| Region Type | Explanation | Tolerance to being blocked |
| --- | --- | --- |
| Transient content type | A region filled by dynamic content, e.g. video, flash | Very Low |
| Active static content type | A region filled by static content, e.g. imagery, document, and with frequent user interaction | Low |
| Inactive static content type | A region filled by static content, e.g. imagery, document, and without frequent user interaction | Medium |
| Blank content type | A region filled by desktop background | High |

Referring now to FIGS. 6, 7A-7B & 12, a more detailed description of the steps for generating the interaction region 205 is provided using a flowchart 4000, which begins at Block 4001. The method illustratively includes detecting recent user input within the first window 204a at Block 4009. If there is no recent user input within the first window 204a, the method includes setting the interaction region 205 at the default values based upon a cursor position at Blocks 4009, 4011, 4013. The cursor position is at the geometric center of the interaction region 205. If there has been recent user input within the first window 204a, the method includes generating the user input heat map, and scaling up the interaction region 205 with optional margin. (Blocks 4005, 4007). The method includes checking that the interaction region 205 meets a minimum size threshold, and if not, rounding the size up. (Blocks 4017, 4019). The method then finalizes the interaction region 205 at Block 4019, and ends at Block 4021.

Figure 13:
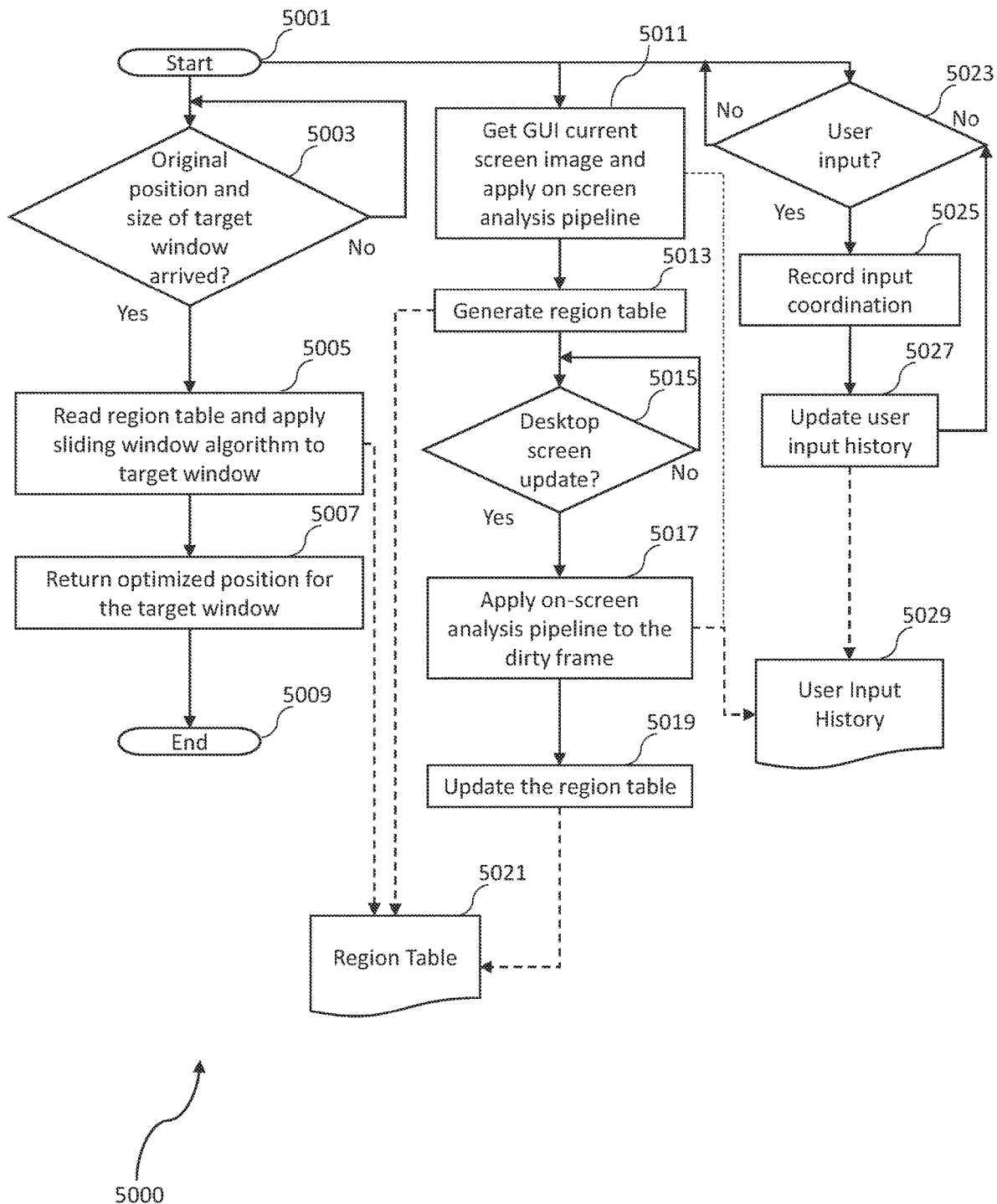
FIG. 13 is a flowchart of generating the region table in the computing device of FIG. 6.
Figure 14:
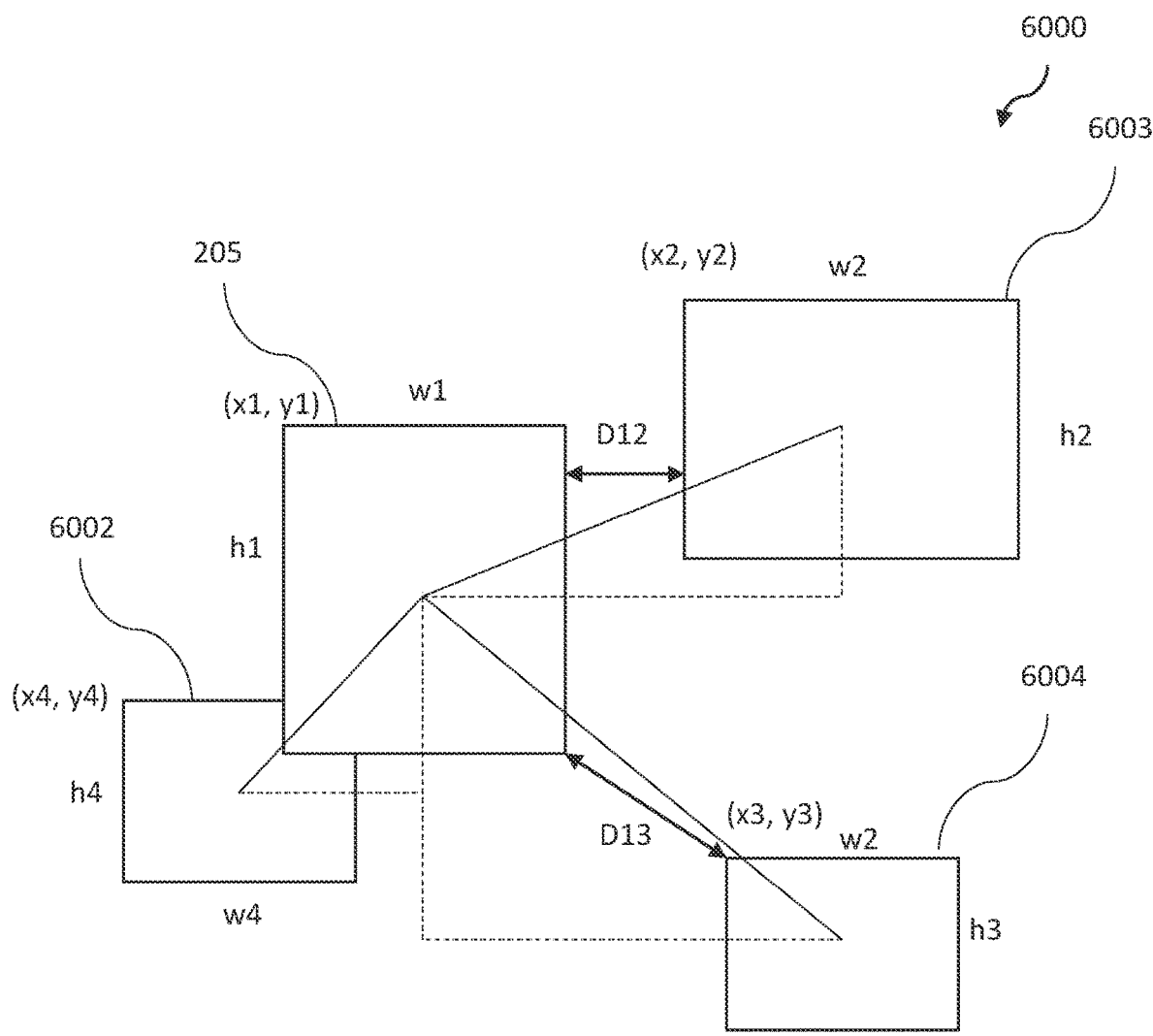
FIG. 14 is a schematic diagram of distance calculations between the first and second windows in the GUI current screen of the computing device of FIG. 6.

Referring now to FIGS. 6, 7A-7B & 13, a more detailed description of the steps for analyzing the GUI current screen 203 is provided using a flowchart 5000, which begins at Block 5001. The method is multi-threaded, each threaded beginning respectively at Blocks 5003, 5011, 5023. In the first thread, the method illustratively includes receiving an original position and size of the second window 204b, and apply a sliding window algorithm using a region table 5021. (Blocks 5003, 5004). In FIG. 13, the dashed lines represent read and write commands to the region table 5021. The method illustratively includes generating an optimized position of the second window 204b at Block 5007 and ending at Block 5009.

In the second thread, the method illustratively includes receiving the GUI current screen 203 and applying an onscreen analysis pipeline, and generating the region table 5021 at Blocks 5011, 5013. The method includes monitoring for screen updates at Block 5015, and applying an onscreen analysis pipeline to the dirty frame at Block 5017. The method includes updating the region table 5021 at Block 5019. In the third thread, the method illustratively comprises monitoring for user input at Block 5023, and recording input coordination at Block 5025. The method includes updating a user input history 5029 at Block 5027.

Referring now to FIGS. 6, 7A-7B & 14, a diagram 6000 shows recovery of the second window 204b in the computing device 200. As the nearest distance changes between the interaction region 205 and the second window 204b, the second window size could be recovered to an initial/original size for better user experience. In order to avoid frequent resizing of the second window 204b, this method tries to recover the second window to the initial size only when second window stays at minimum window size more than a set time period (e.g. 10 seconds).

The steps for calculating the nearest distance between interaction region 205 and the topmost second window 204b are described herein. As diagram 6000 shows, the interaction region 205 is shown while all the other rectangles 6002-6004 are different possible locations for the second window 204b. When the distance in the x axis between center geometry points is less than a half of the sum of both window's width, but the distance in the y axis is larger than a half of the sum of their window height, the nearest distance is equal to distance in the y axis between center points minus a half of their height sum.

When the distance in the x axis between center geometry points is larger than a half of the sum of both window's width, but the distance in the y axis is less than a half of the sum of their window height, the nearest distance is equal to distance in the x axis between center points minus a half of their width sum. When the distance in the x axis between center points is larger than a half of the sum of both window's width, and the distance in the y axis between them is also larger than a half of the sum of both window's height, it directly calculates the nearest distance between their corner points. Otherwise, it means overlap happens between the first window 204a and the second window 204b. Only when topmost second window 204b stays at the minimum window size more than the set time period, it starts to calculate the nearest distance between interaction region 205 and the second window 204b. Sequentially, it restores the second window 204b to the initial window size once the nearest distance is larger than the average distance plus its variance calculated by those nearest distance samples.

In the following, a description of applications of an exemplary embodiment of the computing device 200 is provided. In one application, there is a collaboration between topmost window and any other window. The second window 204b being topmost in z order could overlap with other windows at the back. The interaction region 205 at the back window could be varied as mouse cursor moves, content refreshes or window switches. Once the topmost window overlaps with user interaction region 205 at back, the user must reshape either the topmost window and/or back window to avoid visual interference. The disclosed method keeps following mouse cursor movement and detecting the interaction region 205 based on user activities over past few minutes. It won't trigger window movement or resize when minor overlap happens. First, the method includes resizing the window to avoid overlap when overlapping is smaller than a threshold. Otherwise, it starts to analyze screen content out of the interaction region 205 and finds a best-fit position to relocate topmost window. The method prefers to relocate topmost window in neighborhood than other regions far away from the current position. Meanwhile, it prefers to relocate window to blank region than other regions.

In another application, the collaboration is across a few open windows. When collaboration happens with a few open windows, the user manually realigns or resizes collaborative windows to guarantee no overlapping between them. However, the interaction region 205 could be varied as mouse cursor moves and content changes. As a result, the interaction region 205 in first window 204a could overlap with the focus rectangle in the second window 204b. It requires user to frequently reshape collaborative windows and avoid visual interference.

This method introduces a similar window docking option as a cascade window, a stacked option, and a side-by-side option to arrange open windows. Compared to the existing options, the method works for collaborative windows only, instead of all open windows. Besides, it follows cursor movement and detects the interaction region 205 based on user history over past few minutes. Once the interaction region 205 overlaps with the second window 204b, it starts to reshape the second window to avoid overlaps. Meanwhile, the second window 204b with text content cannot be reshaped less than a threshold to ensure text can be clearly viewed.

For detection of the interaction region 205, the interaction region 205 detection module follows user cursor movement, and forecasts user interaction region based on user activities like mouse click, keyboard, and gesture touch over past few minutes. The content analysis module analyzes content on screen out of interaction region 205 and labels screen regions with transient, active static, plain static and blank tags. The docking decision engine finds a best-fit position to relocate the second window 204b based on screen content and the relative position between the first window 204a and the second window.

For detection of the interaction region 205, user activities in front line mostly interact with mouse, keyboard, touch screen, touch pad and other human-computer equipment. The input devices often interacts with operating system by a variety of events. Thereby, user activities can be monitored by counting the corresponding events with an input device driver hook. For instance, mouse activities on windows can be monitored by mouse events, including but not limited to, WM_SETCURSOR, WM_MOUSEMOVE, WM_LBUT-TONDOWN, and WM_MOUSEACTIVE. The user interaction activities are captured per window level and recorded into metadata metrics to track user input in the interaction region 205, as shown in Table 2.

TABLE 2

| Name | Additional Explanation |
| --- | --- |
| Activity identifier | Unique identifier of a user activity |
| Windows handler | Unique identifier of a window |
| Device name | Peripheral device name where user activity comes from |
| X position | X position |
| Y position | Y position |
| Access timestamp | Access date and time |

This method tracks mouse cursor movement and sets it as geometric center to draw an interaction region 205 with default size. The width of interaction region 205 is equal to the width of current window, while its height is a quarter of the height of current window. On the other hand, it assumes the next activity position in pixels depends on interaction activities on a window in last few minutes before the window switches (e.g. 5 minutes). The interaction region 205 builds on a heat map rectangle to cover most interaction activities on screen in last few minutes with additional margin. Margin is added to offset forecast accuracy issue. In summary, an interaction region 205 is built with a default size when there are no user activities in last few minutes before window switches. Otherwise, it builds on heat map rectangle with additional margin.

For the docking decision engine, the first application comprises collaboration between the topmost window and any other window. The method includes the following steps to coordinate interaction region 205 and topmost window to avoid overlaps. The first step comprises detecting user interaction region 205 in the first window 204a. The second step comprises calculating and recording the nearest distance between the interaction region 205 and the topmost second window 204b when the topmost window has an initial window size. The third step comprises calculating an overlapping ratio that is equal to an overlapping corner dividing a topmost window size. If the overlapping ratio is less than a small threshold, do nothing and exit, otherwise, go to the next step.

The fourth step comprises if overlapping ratio is less than a medium threshold, try to scale down topmost window size until no overlap. If window size after resize attempt is not less than a minimum threshold, the topmost window is resized accordingly. The minimum threshold depends on content in topmost window. Text content has a greater threshold than image or video content. Otherwise, the method goes to the next step.

The fifth step comprises analyzing screen content out of the interaction region 205 and the second window, 204b and tagging each region. The sixth step comprises merging adjacent cells close to topmost window based on region tag priority and find a best-fit region to dock topmost window. If yes, move or resize topmost window to the new region, and exit. Otherwise, go to the next step. The seventh step comprises finding a best-fit region in whole screen based on region tag priority to dock topmost window. If yes, move and resize topmost window to the new region, and end the method.

This method takes the following preference to adjust the topmost window size or position in order to avoid overlap with user interaction region 205 in the first window 204a. First, scale down window size without windows movement. Second, move the window to a best-fit region in neighborhood after merging with adjacent regions based upon region tag priority. (blank region>active static region>transient region). Third, find a best-fit region out of neighborhood based on region tag priority and move window.

Generally, the method prefers to keep topmost window in neighborhood by either resizing window or moving window position. If this is not possible, the method finds a best-fit region out of neighborhood based on region tags and relocate topmost window. Furthermore, the method prefers to dock topmost window to a blank region and avoid overlap with meaningful text, images or videos. In this scenario, some other windows could be open on screen, except for the topmost second window 204b and the first window 204a. Thereby, it requires to dock the topmost window in a reasonable region to avoid visual interference to other windows as possible as it can.

In the second application, the collaboration is across a few open windows. The user selects two or more open windows and auto docks them in collaborative mode. Here, the first window 204a is docked in full screen, while one or more second windows 204b are floated as the topmost window. Once open, windows manually enter the collaborative mode, and the method applies the same logic noted above to follow the interaction region 205 and dock second windows 204b with zero overlap accordingly.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing device comprising:
   a display;
   a processor coupled to the display and configured to
      generate a graphical user interface (GUI) current screen on the display, the GUI current screen comprising a first window and a second window docked to the first window, the second window overlapping the first window,
      determine an interaction region in the first window based upon user input in the first window,
      determine a ratio of overlap between the first window and the second window, and
      resize the second window based upon the ratio of overlap and so that the second window does not overlap the interaction region.

2. The computing device of claim 1 wherein the processor is configured to when the ratio of overlap is less than a first threshold, retain an original size for the second window, and otherwise when the ratio of overlap is less than a second threshold greater than the first threshold, resize the second window until the ratio of overlap is less than the first threshold.

3. The computing device of claim 2 wherein the processor is configured to, when the ratio of overlap is greater than the second threshold:
   divide the GUI current screen into a plurality of different content regions, each different content region having a region size value, and a region position value,
   classify each of the plurality of different content regions as a content type from among a plurality of different content types; and
   generate a new window position value for the second window based upon the respective region size values, the respective region position values, and the respective content types of the plurality of different content regions.

4. The computing device of claim 3 wherein the processor is configured to merge adjacent different content regions with a same content type.

5. The computing device of claim 3 wherein the processor is configured to:
   classify the second window as a content type from among the plurality of different content types; and
   resize the second window based upon a threshold size for the second window, the threshold size for the second window being based upon a content type of the second window.

6. The computing device of claim 5 wherein the processor is configured to, when the second window is at the threshold size for a time period greater than a set time period:
   determine a distance between the interaction region and the second window; and
   when the distance between the interaction region and the second window is greater than a threshold distance, resize the second window to an original size for the second window.

7. The computing device of claim 5 wherein the plurality of different content types comprises a transient content type, a static content type, and a blank content type.

8. The computing device of claim 7 wherein the classifying comprises masking the GUI current screen with a background image, and classifying matching content regions as the blank content type.

9. The computing device of claim 1 wherein the processor is configured to:
   generate a heat map of historical user input in the first window; and
   when the heat map is greater in size than the interaction region, scale up the interaction region to encompass the heat map.

10. The computing device of claim 1 wherein the processor is configured to determine the interaction region based upon a cursor position.

11. A computing system comprising:
    at least one server configured to provide a virtual computing session comprising a graphical user interface (GUI); and
    a client computing device in communication with the at least one server and configured to access the virtual computing session via a communications network, and display a GUI current screen comprising a first window and a second window docked to the first window, the second window overlapping the first window;
    the at least one server configured to
       determine an interaction region in the first window based upon user input in the first window,
       determine a ratio of overlap between the first window and the second window, and
       resize the second window based upon the ratio of overlap and so that the second window does not overlap the interaction region.

12. The computing system of claim 11 wherein the at least one server is configured to when the ratio of overlap is less than a first threshold, retain an original size for the second window, and otherwise when the ratio of overlap is less than a second threshold greater than the first threshold, resize the second window until the ratio of overlap is less than the first threshold.

13. The computing system of claim 12 wherein the at least one server is configured to, when the ratio of overlap is greater than the second threshold:
    divide the GUI current screen into a plurality of different content regions, each different content region having a region size value, and a region position value,
    classify each of the plurality of different content regions as a content type from among a plurality of different content types; and
    generate a new window position value for the second window based upon the respective region size values, the respective region position values, and the respective content types of the plurality of different content regions.

14. The computing system of claim 13 wherein the at least one server is configured to merge adjacent different content regions with a same content type.

15. The computing system of claim 13 wherein the at least one server is configured to:
    classify the second window as a content type from among the plurality of different content types; and
    resize the second window based upon a threshold size for the second window, the threshold size for the second window being based upon a content type of the second window.

16. The computing system of claim 15 wherein the at least one server is configured to, when the second window is at the threshold size for a time period greater than a set time period:
   determine a distance between the interaction region and the second window; and
   when the distance between the interaction region and the second window is greater than a threshold distance, resize the second window to an original size for the second window.

17. The computing system of claim 15 wherein the plurality of different content types comprises a transient content type, a static content type, and a blank content type.

18. The computing system of claim 17 wherein the classifying comprises masking the GUI current screen with a background image, and classifying matching content regions as the blank content type.

19. The computing system of claim 11 wherein the at least one server is configured to:
   generate a heat map of historical user input in the first window; and
   when the heat map is greater in size than the interaction region, scale up the interaction region to encompass the heat map.

20. The computing system of claim 11 wherein the at least one server is configured to determine the interaction region based upon a cursor position.

21. A method of operating a graphical user interface (GUI) on a display, the GUI comprising a GUI current screen comprising a first window and a second window docked to the first window, the second window overlapping the first window, the method comprising:
   determining an interaction region in the first window based upon user input in the first window;
   determining a ratio of overlap between the first window and the second window; and
   resizing the second window based upon the ratio of overlap and so that the second window does not overlap the interaction region.

22. The method of claim 21 further comprising when the ratio of overlap is less than a first threshold, retaining an original size for the second window, and otherwise when the ratio of overlap is less than a second threshold greater than the first threshold, resizing the second window until the ratio of overlap is less than the first threshold.

23. The method of claim 22 further comprising, when the ratio of overlap is greater than the second threshold:
   dividing the GUI current screen into a plurality of different content regions, each different content region having a region size value, and a region position value,
   classifying each of the plurality of different content regions as a content type from among a plurality of different content types; and
   generating a new window position value for the second window based upon the respective region size values, the respective region position values, and the respective content types of the plurality of different content regions.

24. The method of claim 23 further comprising merging adjacent different content regions with a same content type.

25. The method of claim 23 further comprising:
   classifying the second window as a content type from among the plurality of different content types; and
   resizing the second window based upon a threshold size for the second window, the threshold size for the second window being based upon a content type of the second window.

\* \* \* \* \*